(12) United States Patent
Saiki

(10) Patent No.: US 8,411,332 B2
(45) Date of Patent: Apr. 2, 2013

(54) IMAGE FORMING APPARATUS

(75) Inventor: Katsushi Saiki, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 233 days.

(21) Appl. No.: 13/069,519

(22) Filed: Mar. 23, 2011

(65) Prior Publication Data

US 2011/0235133 A1 Sep. 29, 2011

(30) Foreign Application Priority Data

Mar. 26, 2010 (JP) ................. 2010-071247

(51) Int. Cl.
*H04N 1/04* (2006.01)
(52) U.S. Cl. ........ 358/474; 358/475; 358/509; 399/285; 399/88; 345/95; 345/89
(58) Field of Classification Search .......... 358/474, 358/497, 496, 486, 296, 501, 475, 509, 483; 399/285, 88, 49, 72; 345/87–107
See application file for complete search history.

(56) References Cited

U.S. PATENT DOCUMENTS

| | | | | |
|---|---|---|---|---|
| 5,809,369 A | * | 9/1998 | Furuya et al. | 399/70 |
| 7,269,368 B2 | * | 9/2007 | Sato et al. | 399/69 |
| 7,633,478 B2 | * | 12/2009 | Morita | 345/95 |
| 7,693,440 B2 | * | 4/2010 | Sato et al. | 399/69 |
| 7,831,165 B2 | * | 11/2010 | Segawa | 399/69 |
| 2003/0142989 A1 | | 7/2003 | Kobayashi | |
| 2011/0142472 A1 | * | 6/2011 | Mitsuoka et al. | 399/69 |

FOREIGN PATENT DOCUMENTS

| | | |
|---|---|---|
| JP | 9-185299 | 7/1997 |
| JP | 2003-177638 | 6/2003 |
| JP | 2003-223089 | 8/2003 |
| JP | 2003-260824 | 9/2003 |

* cited by examiner

*Primary Examiner* — Negussie Worku

(74) *Attorney, Agent, or Firm* — Smith, Gambrell & Russell, LLP

(57) ABSTRACT

A power saving mode includes a plurality of levels that are different in recovery time to a normal mode and in power consumption of a main body system. The plurality of levels are set to correspond to remaining heat temperature of a fixing device so that the recovery time to the normal mode becomes shorter as the remaining heat temperature is higher, and the power consumption of the main body system becomes lower as the remaining heat temperature is lower. Depending on a change in the remaining heat temperature, a power control section switches to a level corresponding to the remaining heat temperature, of the plurality of levels of the power saving mode of the main body system.

13 Claims, 6 Drawing Sheets

LASER BEAM

FIG.6

|  | POWER SAVING MODE ||||||
|---|---|---|---|---|---|
|  | LEVEL1 | LEVEL2 | LEVEL3 | LEVEL4 ||
|  |  |  |  | SUBLEVEL4-1 | SUBLEVEL4-2 |
| OPERATION PANEL | TURN OFF BACKLIGHT | STOP POWER SUPPLY | STOP POWER SUPPLY | STOP POWER SUPPLY | STOP POWER SUPPLY |
| ENGINE CONTROL SECTION | Ready | STOP POWER SUPPLY | STOP POWER SUPPLY | STOP POWER SUPPLY | STOP POWER SUPPLY |
| MAIN BODY CONTROL SECTION | Ready | Ready | Sleep | STOP POWER SUPPLY | STOP POWER SUPPLY |
| SCANNER CONTROL SECTION | Ready | STOP POWER SUPPLY | STOP POWER SUPPLY | STOP POWER SUPPLY | STOP POWER SUPPLY |
| POWER CONTROL SECTION | Ready | Ready | Ready | Ready | Ready |
| OPERATION AT THE TIME OF RECOVERY | NONE | NONE | NONE | NONE | CALIBRATION |
| MAIN BODY RECOVERY TIME | 0 SECONDS | 5 SECONDS | 10 SECONDS | 30 SECONDS | 35 SECONDS |
| POWER CONSUMPTION | 70W | 25W | 10W | 2W | 2W |

IMAGE FORMING APPARATUS

This application is based upon and claims the benefit of priority from the corresponding Japanese Patent Application No. 2010-071247 filed on Mar. 26, 2010, the entire contents of which are incorporated herein by reference.

BACKGROUND OF THE INVENTION

1. Field of the Invention

The present invention relates to an image forming apparatus in which a power supply mode is shifted between a normal mode and a power saving mode (sleep mode or low power mode).

2. Description of Related Art

In general image forming apparatuses such as a multifunction peripheral and a printer, a power supply mode is shifted between a normal mode and a power saving mode. The normal mode refers to a mode in which power is supplied to each section of the apparatus to maintain a state that is ready for printing. On the other hand, the power saving mode refers to a mode in which power supply to the apparatus is partially stopped to reduce power consumption as compared to the normal mode. For example, in a case where there is no operation performed on the image forming apparatus for a predetermined period of time, the image forming apparatus shifts from the normal mode to the power saving mode, to thereby save power. In a case where there is any operation or input performed on the image forming apparatus during the power saving mode or when printing is performed based on image data received from a network, the image forming apparatus recovers from the power saving mode to the normal mode to enter the state that is ready for printing.

By the way, the image forming apparatus requires a certain length of preparation time to enter the state that is ready for printing after the apparatus starts recovery from the power saving mode to the normal mode or after the apparatus is activated (powered ON). Such a preparation time is most necessary for a fixing device, for example. Specifically, the fixing device requires a certain length of time (stabilizing time) to raise and stabilize the temperature of a heating roller up to a temperature necessary to fix a toner image (fixing temperature) by using a fixing heater that generates heat when supplied with power. In a case of a color image forming apparatus, in particular, a large quantity of heat is necessary in the toner image fixing process, and hence a relatively long period of time is necessary for the fixing device to enter the state that is ready for printing (ready for fixing). At this time, on an apparatus main body side, various kinds of processing such as control system initialization and memory initialization are necessary for recovery from the power saving mode to the normal mode. In a case where the stabilizing time of the fixing device is sufficiently long, the above-mentioned processing such as the control system initialization can be performed sufficiently by the time when the fixing device is stabilized, and hence there can arise no problem with the control.

In recent years, however, the fixing heater and the heating roller have improved to reduce the stabilizing time of the fixing device, and in some cases, there is being introduced a fixing device which enters the state that is ready for printing in a shorter period of time than a recovery time necessary for, for example, the control system initialization processing on the apparatus main body side. In a case of employing such a fixing device, if the recovery time of the control system is longer than the stabilizing time of the fixing device, printing cannot be performed until the control system recovers even though the fixing device is in the state that is ready for printing, with the result that user convenience is lowered. Therefore, reduction in recovery time of the control system is demanded.

In view of the above, in a conventional image forming apparatus, a dedicated control bus for a peripheral control section starts to operate in response to input from a reset section for initializing an arithmetic processing device at the time of power-ON, to thereby initialize the peripheral control section. As a result, the recovery time of the entire system is reduced. Note that, a program for controlling the operation of the dedicated control bus is stored in a nonvolatile memory. Further, in another conventional image forming apparatus, a nonvolatile memory for storing initial values of setting data of function blocks is provided to an integrated circuit for a peripheral control section separately from a register block for storing the setting data of the function blocks. The initial values are set at the same time as the recovery, and hence there is no need for a period of time necessary for the control program to initialize the integrated circuit for the peripheral control section, with the result that the system recovery time is reduced.

However, the above-mentioned conventional image forming apparatuses are configured on a premise of employing a fixing device having a small heat capacity and requiring a sufficiently short stabilizing time from the start of power supply to the fixing heater until the temperature reaches to the fixing temperature. Such a fixing device is more expensive than an ordinary fixing device having large heat capacity because a special fixing heater and a special heating roller are employed. As a result, cost for the entire apparatus increases. Further, in the case of employing the fixing device having a small heat capacity, the above-mentioned nonvolatile memory is necessary to reduce the initialization time of the control system, and hence a further increase in cost for the entire apparatus is inevitable.

As described above, in the conventional image forming apparatuses, higher user convenience is sought by reducing the system recovery time, and hence the cost for the entire apparatus is not taken into consideration. There is a demand for an image forming apparatus having such a configuration that may achieve cost reduction and higher user convenience without employing the special fixing device having a small heat capacity.

In recent years, power saving has been demanded for electrical apparatuses, and also in the image forming apparatus, reduction in power consumption has become more important. However, when the effect of reducing the power consumption is extremely sought in the configuration employing the low-cost fixing device having a large heat capacity, the user convenience may be lowered conversely.

Specifically, in the fixing device having a large heat capacity, even if the fixing heater is turned OFF after the printing is finished, a certain quantity of heat remains. Hence, in a case where the apparatus recovers to the normal mode immediately after the fixing heater is turned OFF and the apparatus shifts to the power saving mode, the fixing heater is turned ON and in no time the temperature of the heating roller reaches to the fixing temperature. In this case, when, for example, power supply to all the function blocks is turned OFF at the same time as the shift from the normal mode to the power saving mode so as to increase the effect of reducing the power consumption in the power saving mode, all the function blocks need to recover at the time of recovery to the normal mode, and hence a long recovery time is necessary. Consequently, printing cannot be performed even though the fixing device is in the state that is ready for printing on ahead, with the result that the user convenience is lowered.

Therefore, in the case of employing the low-cost fixing device having a large heat capacity, in view of the remaining heat after the fixing heater is turned OFF, there is a demand for such a configuration that the effect of enhancing the user convenience by reducing the recovery time to the normal mode, and the effect of reducing the power consumption in the power saving mode can be obtained in a balanced manner.

SUMMARY OF THE INVENTION

The present invention has been made to solve the above-mentioned problems, and it is therefore an object of the present invention to provide an image forming apparatus with which an effect of enhancing user convenience by reducing a recovery time from a power saving mode to a normal mode, and an effect of reducing power consumption in the power saving mode can be obtained in a balanced manner at low cost without employing a special fixing device.

In order to achieve the above-mentioned object, the present invention provides an image forming apparatus, in which a power supply mode is shifted between a normal mode and a power saving mode that requires lower power consumption than the normal mode, the image forming apparatus including: a main body system including a fixing device for fixing a toner image to paper by heat generated through power supply to a heating element; a power control section for controlling power supply to the main body system to turn OFF the power supply to the heating element, and causing the main body system to shift from the normal mode to the power saving mode; and a temperature detecting section for detecting, as remaining heat temperature, temperature of the fixing device due to remaining heat after the power supply to the heating element is turned OFF, in which the power saving mode includes a plurality of levels that are different in recovery time to the normal mode and in power consumption of the main body system, in which the plurality of levels are set to correspond to the remaining heat temperature so that the recovery time to the normal mode becomes shorter as the remaining heat temperature is higher, and the power consumption of the main body system becomes lower as the remaining heat temperature is lower, and in which, depending on a change in the remaining heat temperature, the power control section switches to a level corresponding to the remaining heat temperature, of the plurality of levels of the power saving mode of the main body system.

According to the present invention, the plurality of levels of the power saving mode are set to correspond to the remaining heat temperature so that the recovery time to the normal mode becomes shorter as the remaining heat temperature is higher, and the power consumption of the main body system becomes lower as the remaining heat temperature is lower. Further, depending on the change in the remaining heat temperature, the power control section switches to the level corresponding to the remaining heat temperature, of the plurality of levels of the power saving mode. With this configuration, both the effect of enhancing the user convenience by reducing the recovery time from the power saving mode to the normal mode, and the effect of reducing the power consumption in the power saving mode can be obtained in a balanced manner over the power saving mode at low cost without employing the special fixing device.

Further features and advantages of the present invention will become apparent from the description of embodiments given below.

BRIEF DESCRIPTION OF THE DRAWINGS

FIG. 6 is an explanatory table showing details of a plurality of levels set for a power saving mode.

DETAILED DESCRIPTION OF PREFERRED EMBODIMENTS

Hereinbelow, an embodiment of the present invention is described with reference to the drawings. First, an overall configuration of an image forming apparatus according to this embodiment is described. The description is herein given by taking a tandem color multifunction peripheral for forming an image by an electrophotographic method as an example of the image forming apparatus. The multifunction peripheral (MFP) has various functions in combination, such as functions of a copier, a facsimile machine, a scanner, and a printer.

(Overall Configuration of Image Forming Apparatus)

Figure 1:
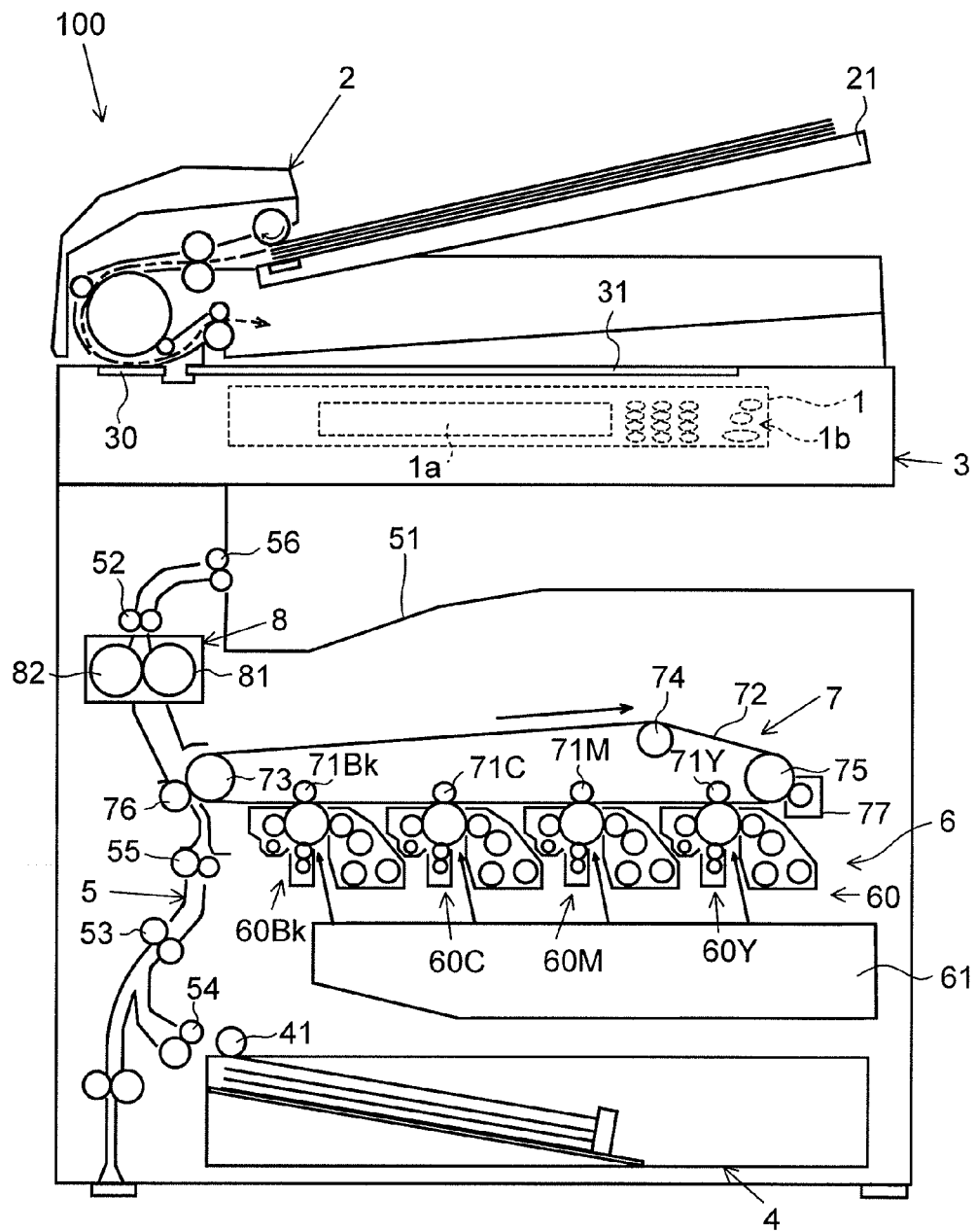
FIG. 1 is a sectional view schematically illustrating an overall configuration of a multifunction peripheral according to an embodiment of the present invention.
Figure 2:
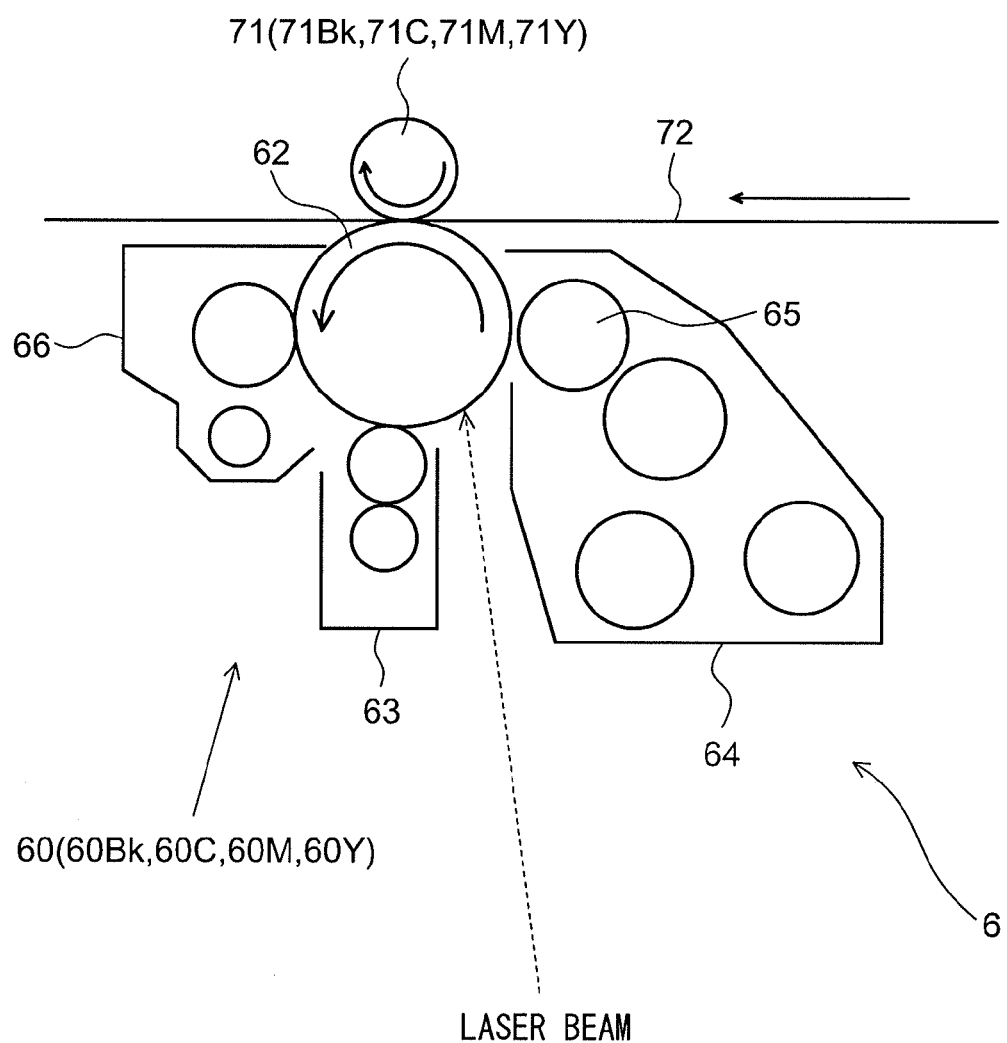
FIG. 2 is an enlarged sectional view illustrating one image forming section of the multifunction peripheral.

FIG. 1 is a sectional view schematically illustrating an overall configuration of a multifunction peripheral 100 according to this embodiment. FIG. 2 is an enlarged sectional view illustrating one image forming section 6 of the multifunction peripheral 100. The multifunction peripheral 100 of this embodiment includes an operation panel 1 in the upper front portion (in FIG. 1, indicated by the broken lines), an original transporting apparatus 2 in the top portion, and a scanner section 3 below the original transporting apparatus 2. Further, a main body of the multifunction peripheral 100 includes a sheet feeding section 4, a transporting section 5, the image forming section 6, an intermediate transferring section 7, and a fixing device 8.

The operation panel 1 functions as a setting section for various settings, such as print settings (for example, number of pages and number of copies), and also as a display section for displaying various kinds of information. In this embodiment, the operation panel 1 includes a touch-screen liquid crystal display section 1a and a plurality of push buttons 1b. The liquid crystal display section 1a functions as the setting section and the display section, while the push buttons 1b function as the setting section. In other words, the liquid crystal display section 1a receives setting input from a user. Note that, the above-mentioned push buttons 1b include numeric keys (number keys of 0 to 9 and symbol keys such as # and C (Clear)), a function selection key (operation mode setting key for copy mode, FAX transmission mode, etc.), and other various keys for start, reset, and stop.

At the time of copying originals, the original transporting apparatus 2 automatically and successively transports originals stacked on an original placing tray 21 one by one toward a reading position (contact glass 30 for reading transported originals) of the scanner section 3 by rotationally driving a plurality of rollers. The original transporting apparatus 2 has a fulcrum provided on the back of the drawing sheet of FIG. 1 so that the original transporting apparatus 2 may be lifted up. In a case where an original is placed on a contact glass 31 for reading a placed original described later, the original transporting apparatus 2 is lifted up and an original is placed on the contact glass 31 for reading a placed original. Then, the original transporting apparatus 2 is pivoted to hold down the original.

The scanner section 3 reads an original to generate image data. On an upper surface of the scanner section 3, the contact glass 30 for reading transported originals and the contact glass 31 for reading a placed original are provided, and inside the scanner section 3, optical members (not shown) are provided, such as an exposure lamp, a mirror, a lens, and an image sensor (for example, CCD). Those optical members are used for casting light on an original transported by the original transporting apparatus 2 or an original placed on the contact glass 31 for reading a placed original, and output values of pixels of the image sensor, which has received the light reflected from the original, are subjected to A/D conversion, to thereby generate image data. The multifunction peripheral 100 can perform printing based on the image data obtained through the reading (copy function).

The sheet feeding section 4 receives, for example, paper (sheets) of different kinds (copy paper, label paper, etc.), and different sizes (A-series and B-series paper, etc.). A sheet feeding roller 41 provided to the sheet feeding section 4 rotates by means of a driving mechanism (not shown) such as a motor to feed paper to the transporting section 5.

The transporting section 5 transports, to a delivery tray 51, the paper fed from the sheet feeding section 4. The transporting section 5 includes a guide plate and transport roller pairs 52 to 54 (in FIG. 1, reference symbols are placed in order from the top) for transporting the paper. Further, the transporting section 5 includes a registration roller pair 55 for keeping the paper upstream from the intermediate transferring section 7 and sending out the paper at a suitable timing, and a delivery roller pair 56 for delivering the paper toward the delivery tray 51.

The image forming section 6 is a part of the multifunction peripheral 100 for forming a toner image based on image data of an image to be formed, and includes image forming units 60 and an exposure device 61. The image forming units 60 are constituted by image forming units corresponding to four colors, that is, from the left of FIG. 1, an image forming unit 60Bk for forming a black image, an image forming unit 60C for forming a cyan image, an image forming unit 60M for forming a magenta image, and an image forming unit 60Y for forming a yellow image. The toner image formed by the image forming section 6 is temporarily transferred (primarily transferred) onto an intermediate transfer belt 72 described later, and then transferred (secondarily transferred) from the intermediate transfer belt 72 onto the paper.

Now, referring to FIG. 2, the image forming units 60Bk to 60Y are described in detail. Note that, the image forming units 60Bk to 60Y are only different in colors of the toner images to be formed, and basically have the same configuration. Therefore, FIG. 2 only illustrates the image forming unit 60 corresponding to one color, and in the following description, the symbols of Bk (black), Y (yellow), C (cyan), and M (magenta), which are used for identifying the colors of the respective image forming units 60, are omitted unless otherwise particularly described.

First, a photosensitive drum 62 (image bearing member) provided to each image forming unit 60 bears the toner image on a circumferential surface thereof. For example, each photosensitive drum 62 has a photosensitive layer such as an amorphous silicon layer formed on an outer peripheral surface of an aluminum drum, and is rotationally driven by a driving device (not shown) counterclockwise with respect to the drawing sheet of FIG. 2 at a predetermined process speed. That is, the image forming section 6 includes a plurality of the photosensitive drums 62 corresponding to the above-mentioned four different colors.

A charging device 63 charges the photosensitive drum 62 to a constant potential with its charging roller brought into contact with the photosensitive drum 62. Note that, the charging device 63 may be of a corona discharge type or a type of using a brush or the like. The exposure device 61 (see FIG. 1) provided below each image forming unit 60 is capable of converting, by using a laser output section (not shown), input image signals obtained by color separation into optical signals, and outputting laser beams (indicated by the broken line) corresponding to the four colors, which are the optical signals obtained through the conversion. The exposure device 61 performs scanning exposure on the charged photosensitive drum 62 to form an electrostatic latent image on the surface thereof.

A developing device 64 receives toner of its corresponding color. Specifically, the developing device 64 of the image forming unit 60Bk receives black toner; the developing device 64 of the image forming unit 60Y, yellow toner; the developing device 64 of the image forming unit 60C, cyan toner; and the developing device 64 of the image forming unit 60M, magenta toner. Further, each developing device 64 includes a developing roller 65 for carrying toner. Each developing roller 65 is opposed to the photosensitive drum 62 to supply toner thereto. A cleaning device 66 removes, for example, residual toner left on the surface of the photosensitive drum 62 after the transfer.

The description is continued referring back to FIG. 1. The intermediate transferring section 7 transfers the images formed on the respective photosensitive drums 62 onto the paper fed from the sheet feeding section 4. Specifically, the intermediate transferring section 7 has toner images primarily transferred by the photosensitive drums 62 and secondarily transfers the toner images onto the paper. The intermediate transferring section 7 includes primary transfer rollers 71 (four primary transfer rollers 71Bk to 71Y in total), the intermediate transfer belt 72, a driving roller 73, driven rollers 74 and 75, a secondary transfer roller 76, and a belt cleaning device 77.

Each primary transfer roller 71 is provided so as to be opposed to the corresponding photosensitive drum 62 across the endless intermediate transfer belt 72, and abuts against the intermediate transfer belt 72. Each primary transfer roller 71 is connected to a transfer bias application section (not shown) for applying a transfer voltage obtained by superimposition of an alternating voltage onto a direct voltage, to thereby transfer the toner images formed on the respective photosensitive drums 62 onto the intermediate transfer belt 72.

The intermediate transfer belt 72 is stretched around the primary transfer rollers 71, the driving roller 73, and the driven rollers 74 and 75, and revolves clockwise with respect to the drawing sheet of FIG. 1 by rotationally driving the driving roller 73 connected to a driving mechanism such as a motor. Further, the driving roller 73 sandwiches the intermediate transfer belt 72 with the secondary transfer roller 76.

The toner images of the respective colors of black, yellow, cyan, and magenta formed by the respective image forming units 60 are primarily transferred onto the intermediate transfer belt 72 in order while being overlaid one on another without misregistration at suitable timings. Note that, at the time of primary transfer, a transfer bias is applied to each primary transfer roller 71. Then, the overlaid toner images of the respective colors are transferred onto the paper by the secondary transfer roller 76 having a predetermined voltage applied thereto. The belt cleaning device 77 removes and collects residual toner or the like left on the intermediate transfer belt 72 after the secondary transfer.

The fixing device 8 heats and pressurizes the toner image obtained by the secondary transfer and fixes the toner image to the paper. The fixing device 8 includes at least a heating roller 81 containing a fixing heater 81a (see FIG. 4), and a pressure roller 82 that comes into pressure-contact with the heating roller 81. Note that, heating control of the fixing device 8 is described later. When the paper onto which the toner image has been transferred passes through a nip between the heating roller 81 and the pressure roller 82, the paper is heated and pressurized, and as a result, the toner image is fixed to the paper. The paper after the fixing is delivered to the delivery tray 51, and the image formation processing is completed.

(Hardware Configuration of Multifunction Peripheral)

Figure 3:
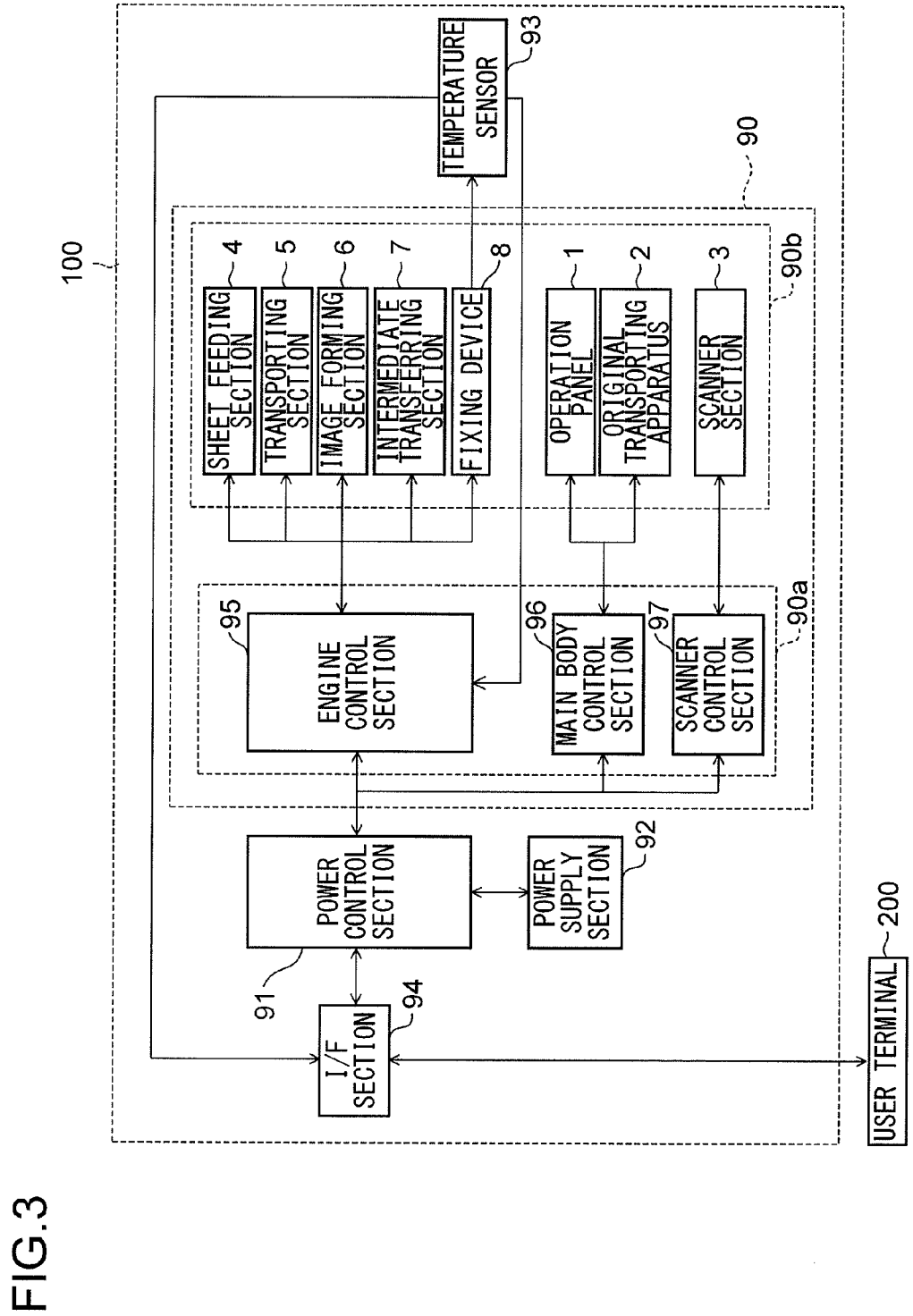
FIG. 3 is a block diagram illustrating an example of a hardware configuration of the multifunction peripheral.

Next, a hardware configuration of the multifunction peripheral 100 according to this embodiment is described. FIG. 3 is a block diagram illustrating an example of the hardware configuration of the multifunction peripheral 100 according to this embodiment. The multifunction peripheral 100 according to this embodiment includes a main body system 90, a power control section 91, a power supply section 92, a temperature sensor 93, and an interface (I/F) section 94.

The main body system 90 includes a main system 90a and a subsystem 90b. The subsystem 90b includes the operation panel 1, the original transporting apparatus 2, the scanner section 3, the sheet feeding section 4, the transporting section 5, the image forming section 6, the intermediate transferring section 7, and the fixing device 8, which have been described above. Note that, the above-mentioned components of the subsystem 90b may be regarded as blocks for performing the predetermined functions described above and are hereinafter also referred to as function blocks. The main system 90a performs control of the subsystem 90b and includes an engine control section 95, a main body control section 96, and a scanner control section 97. In other words, the engine control section 95, the main body control section 96, and the scanner control section 97 function as system control sections for controlling operations of the above-mentioned function blocks.

The engine control section 95 controls electric components of engine sections involved in printing in the multifunction peripheral 100 with extended functions under control of application specific integrated circuits (ASICs). Specifically, the engine control section 95 includes a central processing unit (CPU) and circuits for controlling operations of the sheet feeding section 4, the transporting section 5, the image forming section 6, the intermediate transferring section 7, the fixing device 8, and driving mechanisms (including motors and gears) thereof. The engine control section 95 communicates with the main body control section 96 mounted on a control substrate for performing image processing and the like, to synchronize the print output and the image data.

The main body control section 96 includes a CPU and circuits for performing control of the operation panel 1 and the original transporting apparatus 2, to control the engine control section 95 and the scanner control section 97 based on setting input received by the operation panel 1. The main body control section 96 also includes a storage section for storing the image data and a control program for image formation, and an image processing section for performing image processing on the image data.

The scanner control section 97 includes a CPU and circuits for performing control of the scanner section 3 and, similarly to the engine control section 95, communicates with the main body control section 96 to maintain the sequence in reading by the scanner section 3.

The power control section 91 is a CPU for performing control to shift a supply mode of power supplied from the power supply section 92 to the main body system 90 between a normal mode and a power saving mode. In this embodiment, in particular, the power control section 91 turns OFF power supply to fixing heaters 81a and 82a (see FIG. 4), which are to be described later, of the fixing device 8 through the engine control section 95, and at the same time, causes the main body system 90 to shift from the normal mode to the power saving mode. Further, the power control section 91 switches among levels of the power saving mode depending on the temperature detected by the temperature sensor 93, which is to be described later, as described below.

Here, the normal mode refers to a mode in which power from the power supply section 92 is supplied to the control sections and the function blocks of the main body system 90 to maintain a state that is ready for printing. On the other hand, the power saving mode refers to a mode in which power consumption of the main body system 90 is reduced as compared to the normal mode. For example, in a case where there is no operation performed on the multifunction peripheral 100 for a predetermined period of time, the power control section 91 controls so that a backlight of the liquid crystal display section 1a of the operation panel 1 is turned OFF, or the power supply from the power supply section 92 to the control sections and the function blocks of the main body system 90 is stopped, which causes the main body system 90 to shift from the normal mode to the power saving mode as described below.

Further, the power control section 91 in the power saving mode always monitors input of a print job, which is accessed through the I/F section 94 or a network, or a state change of the multifunction peripheral 100 (such as presence or absence of a pressure on the operation panel 1 or pivot operation of the original transporting apparatus 2). Triggered by such input through the network or such state change of the multifunction peripheral 100, the main body system 90 recovers to the normal mode. Note that, at the time of recovery to the normal mode, the following operation is performed:

(1) start of power supply to the function blocks of the main body system;

(2) initialization of the control sections corresponding to the function blocks;

(3) initialization and setting of ASIC functions corresponding to the function blocks;

(4) initializing operation of the main body of the multifunction peripheral; and (5) establishment of communication between the control sections corresponding to the function blocks (for example, between the main body control section 96 and the engine control section 95, and between the main body control section 96 and the scanner control section 97).

The temperature sensor 93 detects the temperature of the fixing device 8 and is constituted, for example, of a thermistor which is in contact with the heating roller 81 (see FIG. 4) for detecting the surface temperature of the heating roller 81, or may alternatively be constituted of a non-contact thermistor. The output from the temperature sensor 93 is input to the above-mentioned power control section 91 and to the engine control section 95. This allows the engine control section 95 in the normal mode to control power supply to the fixing heaters 81a and 82a based on the temperature detected by the temperature sensor 93.

Further, in this embodiment, the temperature sensor 93 functions in particular as a temperature detecting section for detecting the temperature of the fixing device 8 due to the remaining heat after power supply to the fixing heaters 81*a* and 82*a* is turned OFF as remaining heat temperature. This allows the power control section 91 in the power saving mode after turning OFF power supply to the fixing heaters 81*a* and 82*a* to switch among the levels of the power saving mode depending on a change in the above-mentioned remaining heat temperature as described below.

The I/F section 94 is an interface for connecting the multifunction peripheral 100 to another device and includes a plurality of connectors and sockets. This I/F section 94 may be used to communicably connect the multifunction peripheral 100 and a plurality of user terminals 200 (for example, personal computers) via the network. Therefore, the multifunction peripheral 100 may perform printing based on the image data and instructions transmitted from the user terminal 200 (printer function) and further transmit the image data acquired by the scanner section 3 to the user terminal 200 (scanner function). Further, when the I/F section 94 is provided with a modem or the like, the multifunction peripheral 100 may perform FAX communication with an external FAX machine using a public communication line or the like (FAX function). Note that, only one user terminal 200 is illustrated in FIG. 3 for convenience, but it should be understood that a plurality of the user terminals 200 may be connected to the multifunction peripheral 100.

(Heating Control of Fixing Device)

Figure 4:
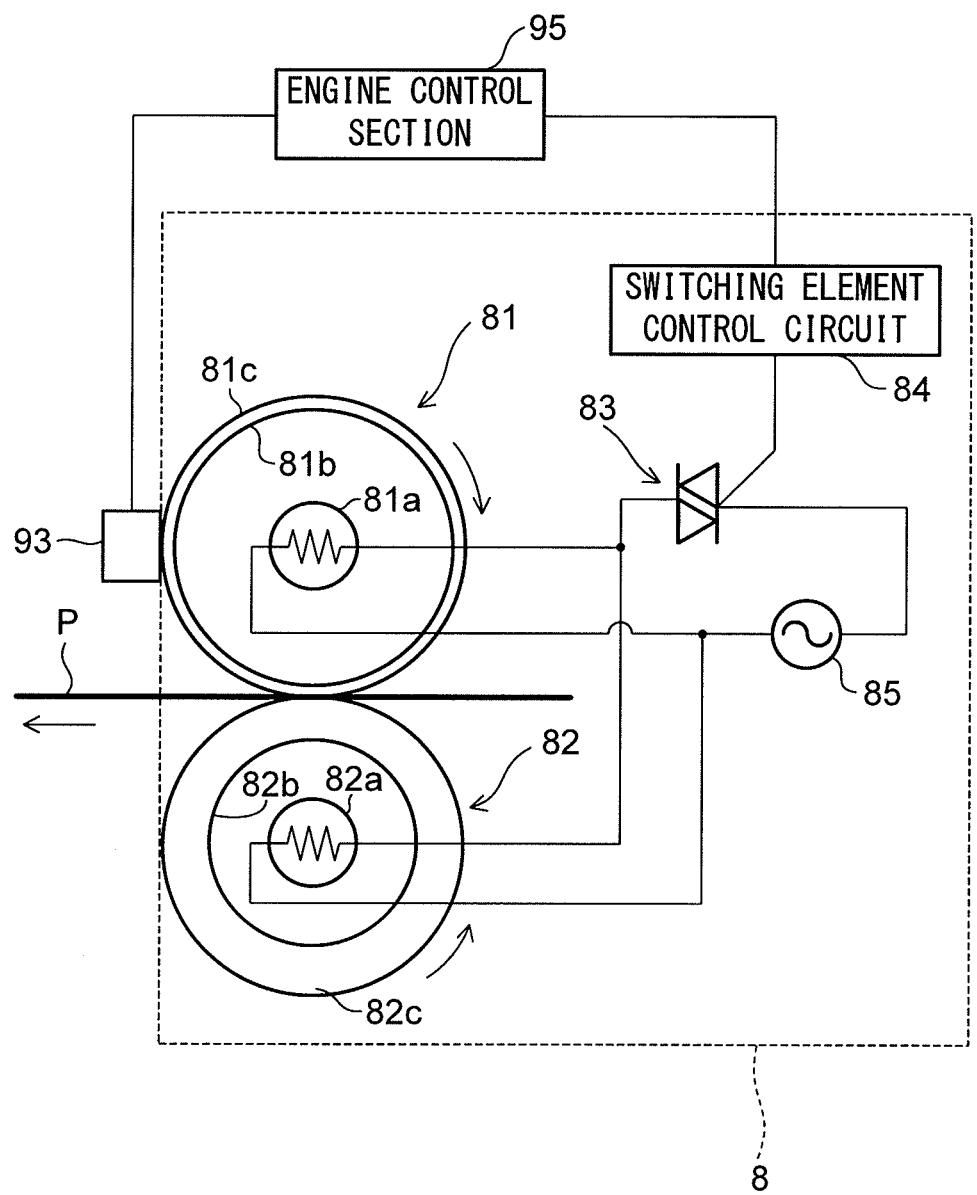
FIG. 4 is an explanatory diagram illustrating an overall configuration of a fixing device of the multifunction peripheral.

Next, heating control of the above-mentioned fixing device 8 is described. FIG. 4 is an explanatory diagram illustrating an overall configuration of the fixing device 8. The fixing device 8 includes the heating roller 81 (heating member), a pressure roller 82 (pressure member), a switching element 83, a switching element control circuit 84, and an AC power supply 85.

Inside the heating roller 81, there is provided the fixing heater 81*a* as a heating element for generating heat when supplied with power, and the fixing heater 81*a* heats the heating roller 81. The fixing heater 81*a* is constituted, for example, of a halogen heater.

The heating roller 81 consists mainly of a cored bar 81*b* made of an iron pipe, for example. Outside the cored bar 81*b*, a release layer 81*c* for increasing toner releasability is formed. The release layer 81*c* may be made, for example, of a fluorine-based resin such as a tetrafluoroethylene-perfluoroalkyl vinyl ether copolymer (PFA), and is formed by spray coating or covering with a tube. Note that, directly inside the release layer 81*c*, a silicon rubber layer as an elastic layer may be provided.

The heating roller 81 is rotated by a driving device (not shown) at a circumferential speed that is equal to the sheet transport speed. Further, the above-mentioned temperature sensor 93 is provided downstream in the rotating direction of the heating roller 81 with respect to the nip between the heating roller 81 and the pressure roller 82 so as to be in contact with the surface of the heating roller 81.

Similarly inside the pressure roller 82, there is provided the fixing heater 82*a* as a heating element for generating heat when supplied with power, and this fixing heater 82*a* heats the pressure roller 82. The fixing heater 82*a* is constituted, for example, of a halogen heater. The fixing heater 82*a* is provided also inside the pressure roller 82 because the multifunction peripheral 100 in this embodiment forms a color image, and hence high fixing temperature (for example, 150 to 170° C.) needs to be obtained in order to increase the fixing property of the four-color toner image.

The pressure roller 82 is constituted of a cored bar 82*b* made of stainless steel, for example, and an elastic layer 82*c* made of sponge silicon rubber, for example, which is formed outside the cored bar 82*b*. The pressure roller 82 is pressed against the heating roller 81 by biasing means (not shown) and is rotated with the rotation of the heating roller 81. By transporting paper P into the nip formed between the heating roller 81 and the pressure roller 82, the toner image on the paper P is fused by the heat of the heating roller 81 and the pressure roller 82 to be fixed on the paper P.

Note that, any one or both of the heating roller 81 and the pressure roller 82 may be replaced by a belt or belts. In a case where the heating roller 81 is replaced by a belt, for example, a metal layer may be formed outside a polyimide film by plating or rolling and then coated externally with a fluorine-based resin such as PFA. Further, in a case where the pressure roller 82 is replaced by a belt, for example, a sponge silicon rubber layer may be formed outside a polyimide film.

Note that, each of the fixing heaters 81*a* and 82*a* for heating the heating roller 81 and the pressure roller 82 is not limited to the halogen heater and may be constituted, for example, of a ceramic heater or a nichrome wire resistor. Further, instead of providing the fixing heater inside the pressure roller 82, there may be employed a configuration in which one or two fixing heaters are provided inside the heating roller 81.

The switching element 83 is constituted, for example, of a triac and turns AC power supply from the AC power supply 85 to the fixing heaters 81*a* and 82*a* ON or OFF. The switching element control circuit 84 is a circuit for controlling the switching element 83 based on a control signal from the engine control section 95 and includes, for example, a light emitting diode and a phototransistor.

With this configuration, when the light emitting diode of the switching element control circuit 84 is turned ON, the phototransistor is turned ON to turn ON the switching element 83 so that the AC power supply 85 supplies AC power to the fixing heaters 81*a* and 82*a*. On the other hand, when the light emitting diode of the switching element control circuit 84 is turned OFF, the phototransistor is turned OFF to turn OFF the switching element 83 so that the AC power supply 85 stops supplying the AC power to the fixing heaters 81*a* and 82*a*.

In the normal mode, the control to turn ON or OFF the light emitting diode in the switching element control circuit 84 is performed by the engine control section 95 based on the temperature detected by the temperature sensor 93. Accordingly, in the normal mode, the fixing temperature of the fixing device 8 may be maintained at constant temperature, and hence the toner image may be fixed at good fixing temperature.

Note that, instead of the switching element 83 and the switching element control circuit 84 described above, a phototriac coupler, which is a composite semiconductor element including the light emitting diode and a triac having a photo-gate input, may be used.

(Details of Power Saving Mode)

Next, details of the power saving mode in this embodiment are described.

Figure 5:
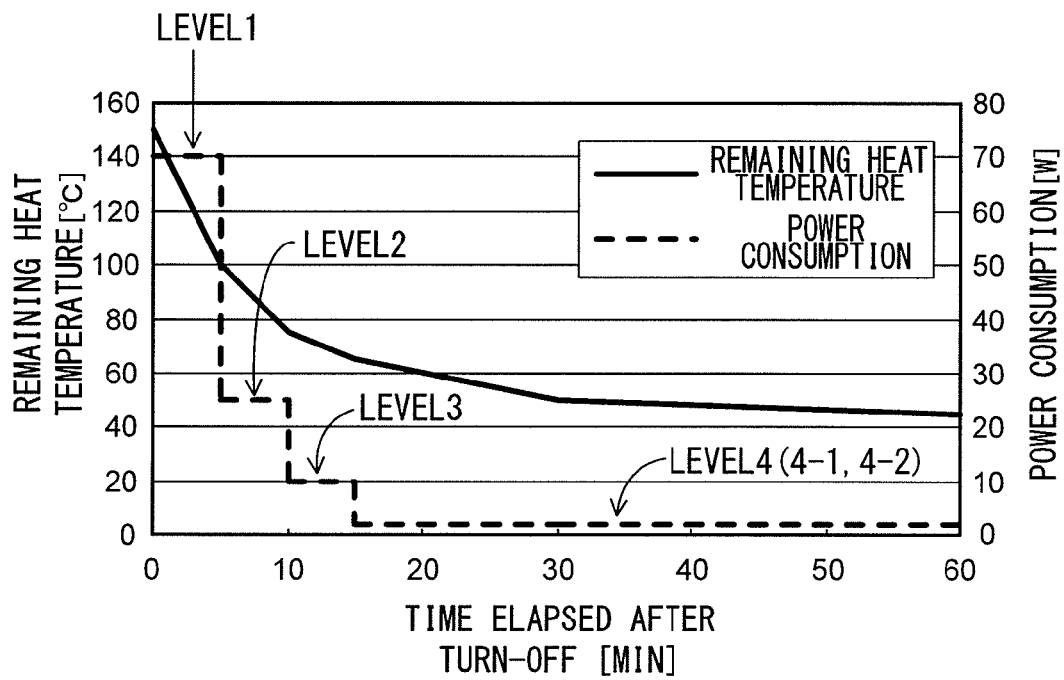
FIG. 5 is a graph showing a relationship between the time elapsed after power supply to fixing heaters is turned OFF and remaining heat temperature in the fixing device.

FIG. 5 is a graph showing a relationship between the time elapsed after power supply to the fixing heaters 81*a* and 82*a* is turned OFF and the remaining heat temperature in the fixing device 8 having the above-mentioned configuration. As shown in the figure, the fixing device 8 has a heat capacity that is large enough to retain the remaining heat of about 50° C. even when 30 minutes have elapsed after the power supply to the fixing heaters 81*a* and 82*a* is turned OFF. In other words, even after turning OFF the power supply to the fixing heaters 81a and 82a, heat remains in the heating roller 81 and the pressure roller 82 because the rate of the decrease in temperature of the heating roller 81 and the pressure roller 82 is low.

Here, in a high temperature range of the remaining heat (for example, the remaining heat temperature of 100° C. or higher), when the power supply to the fixing heaters 81a and 82a is started for recovery to the normal mode, the heating roller 81 and the pressure roller 82 also reach to the fixing temperature in a short time. Therefore, in order to enhance the user convenience, the recovery time of the main body system 90 also needs to be short. On the other hand, in a low temperature range of the remaining heat (for example, the remaining heat temperature below 65° C.), at the time of recovery to the normal mode, it takes some time for the heating roller 81 and the pressure roller 82 to reach to the fixing temperature, which allows enough time for the main body system 90 to recover, and hence more power may be saved by setting the main body system 90 to a more extensive power saving mode.

Therefore, in this embodiment, a plurality of levels that are different in recovery time to the normal mode and in power consumption of the main body system 90 are set for the power saving mode, and these levels are switched depending on the remaining heat temperature of the fixing device 8 so as to obtain the effect of enhancing user convenience and the effect of reducing power consumption in a balanced manner. This is described in more detail below.

FIG. 6 is an explanatory table showing details of the plurality of levels set for the power saving mode in this embodiment. As shown in the figure, four levels of Levels 1 to 4 are set for the power saving mode.

Level 1 is a power saving mode in which the power control section 91 supplies power to the engine control section 95, the main body control section 96, the scanner control section 97, and the function blocks corresponding thereto, except that the power control section 91 turns OFF the backlight of the liquid crystal display section 1a of the operation panel 1 through the main body control section 96. In Level 1, the power consumption is 70 W, which is the highest power consumption when compared to other Levels 2 to 4, but the fixing heaters 81a and 82a themselves are OFF so as to attain a large power saving effect as the entire multifunction peripheral 100. Further, a main body recovery time, that is, a recovery time of the main body system 90 to the normal mode is 0 seconds, and hence the main body system 90 may recover immediately at the time of recovery so as to perform printing, which is most effective in enhancing user convenience. Note that, "Ready" in the figure indicates that the entire multifunction peripheral 100 is in a state capable of the normal operation so that printing may be performed at any time.

Level 2 is a power saving mode in which the power control section 91 supplies power to the main body control section 96, and in which the power control section 91 stops power supply to the function blocks (for example, operation panel 1) corresponding to the main body control section 96 and also stops power supply to the engine control section 95, the scanner control section 97, and the function blocks corresponding thereto. In Level 2, the recovery time to the normal mode is longer than that in Level 1 but is still about 5 seconds, which is short enough for user convenience. Further, the power consumption is 25 W, to thereby increase the power saving effect when compared to Level 1.

Level 3 is a power saving mode in which, in addition to the state of Level 2, the power control section 91 sets the main body control section 96 to a sleep state. Note that, the above-mentioned sleep state herein refers to a state in which power itself is supplied to the main body control section 96, but the operation clock is stopped. The mere stop of the operation clock may suppress the power consumption to 10 W, with the result that the power consumption may be reduced when compared to Level 2. On the other hand, the recovery time of the main body system 90 is 10 seconds, which is longer when compared to that in Level 2 but is still regarded as being capable of contributing to enhancing user convenience.

Level 4 is a power saving mode in which the power control section 91 stops power supply to the engine control section 95, the main body control section 96, the scanner control section 97, and the function blocks corresponding thereto, and hence is a power saving mode having the highest power saving effect and the longest recovery time to the normal mode. Level 4 includes a plurality of Sublevels 4-1 and 4-2. Sublevel 4-2 is different from Sublevel 4-1 in that calibration is performed at the time of recovery to the normal mode, but the power consumption is the same as in Sublevel 4-1. Note that, in terms of expression, the levels and the sublevels are clearly distinguished.

Note that, the calibration herein refers to a color correction operation in a case where color printing is performed. Specifically, a process of writing a predetermined pattern on a photosensitive drum and reading the pattern by a sensor to correct the density and color shift is performed. Sublevel 4-2 is longer in recovery time to the normal mode than Sublevel 4-1 by the time required to perform the calibration.

It can be seen from FIG. 6 that, as the level of the power saving mode becomes closer to Level 1, the power consumption becomes higher and hence the power saving mode becomes less extensive. Conversely, it can be also seen from FIG. 6 that, as the level of the power saving mode becomes closer to Level 4, the power consumption becomes lower and hence the power saving mode becomes more extensive. Therefore, in this embodiment, the extensiveness of the power saving mode is changed by setting the plurality of levels.

Four Levels 1 to 4 described above are set to correspond to the remaining heat temperature of the fixing device 8. More specifically, as shown in FIG. 5, Level 1 (power consumption: 70 W) is set to correspond to the remaining heat temperature of the fixing device 8 of 100° C. or higher and lower than 150° C., Level 2 (power consumption: 25 W) is set to correspond to the remaining heat temperature of 75° C. or higher and lower than 100° C., Level 3 (power consumption: 10 W) is set to correspond to the remaining heat temperature of 65° C. or higher and lower than 75° C., and Level 4 (power consumption: 2 W) is set to correspond to the remaining heat temperature of lower than 65° C.

At this time, as shown in FIG. 6, Levels 1 to 4 are set so that the recovery time to the normal mode is reduced as the level becomes closer to Level 1, and so that the effect of reducing the power consumption is increased as the level becomes closer to Level 4. Therefore, it can be seen from the relationship between the remaining heat temperature of the fixing device 8 and the recovery time or the relationship between the remaining heat temperature and the power consumption that Levels 1 to 4 are set to correspond to the remaining heat temperature of the fixing device 8 so that the recovery time to the normal mode becomes shorter as the remaining heat temperature becomes higher, and the power consumption of the main body system 90 becomes lower as the remaining heat temperature becomes lower.

In this embodiment, as described above, the power control section 91 switches to a level corresponding to the remaining heat temperature, of the levels of the power saving mode, depending on the change in remaining heat temperature of the fixing device 8 (heating roller 81). For example, in a case where the fixing heaters 81a and 82a are turned OFF (power supply thereto is turned OFF) when a predetermined period of time has elapsed after the printing is finished, the remaining heat temperature of the fixing device 8 is reduced with time as shown in FIG. 5. Therefore, the power control section 91 switches among the levels of the power saving mode of the main body system 90 in order of Level 1, Level 2, Level 3, and Level 4 to correspond to the reducing remaining heat temperature, to thereby perform power saving control corresponding to each level.

In other words, until 5 minutes have elapsed after the fixing heaters 81a and 82a are turned OFF, the remaining heat temperature is 100° C. or higher, and hence the power control section 91 executes the power saving mode of Level 1. In Level 1, the power consumption of the main body system 90 is higher when compared to other Levels 2 to 4, but the fixing heaters 81a and 82a themselves are OFF as described above and hence the power consumption of the entire multifunction peripheral 100 is small. Further, at the time when the main body system 90 recovers to the normal mode, recovery in the shortest time is possible, and hence user convenience may be greatly enhanced.

When 5 minutes have elapsed after the fixing heaters 81a and 82a are turned OFF, the remaining heat temperature falls below 100° C. Therefore, the power control section 91 switches from Level 1 to Level 2, of the levels of the power saving mode. Further, when 10 minutes have elapsed after the fixing heaters 81a and 82a are turned OFF, the remaining heat temperature falls below 75° C. Therefore, the power control section 91 switches from Level 2 to Level 3, of the levels of the power saving mode. With such switching among the levels of the power saving mode, the effect of reducing the power consumption of the main body system 90 may be gradually increased. Further, when 15 minutes have elapsed after the fixing heaters 81a and 82a are turned OFF, the remaining heat temperature falls below 65° C. Therefore, the power control section 91 switches from Level 3 to Level 4, of the levels of the power saving mode. In Level 4, power saving of the main body system 90 may be performed to the maximum extent.

Note that, in Level 4, for example, until 40 minutes have elapsed after the fixing heaters 81a and 82a are turned OFF, the power saving mode of Sublevel 4-1 is executed, and when 40 minutes have elapsed, the power saving mode of Sublevel 4-2 is executed. Note that, as described above, Sublevels 4-1 and 4-2 are the same in power consumption and only different in recovery time at the time of recovery to the normal mode.

As described above, the power control section 91 switches to a level corresponding to the remaining heat temperature, of the levels of the power saving mode, so as to obtain the effect of enhancing the user convenience by reducing the recovery time from the power saving mode to the normal mode in the state in which the remaining heat temperature is high (for example, Level 1). At this time, in the power saving mode, power supply itself to the fixing heaters 81a and 82a is OFF, and hence the power consumption of the entire apparatus may be reduced even in a state in which the remaining heat temperature is high. On the other hand, in a case where the remaining heat temperature is low (for example, Levels 2 to 4), the power consumption of the main body system 90 may be reduced to further reduce the power consumption of the entire apparatus.

In short, with the switching among the levels of the power saving mode depending on the remaining heat temperature of the fixing device 8 as described above, both the effect of enhancing user convenience and the effect of reducing the power consumption may be obtained. In particular, the effect of enhancing user convenience is given priority in the state in which the remaining heat temperature of the fixing device 8 is high, and the effect of reducing the power consumption of the main body system 90 is given priority in the state in which the remaining heat temperature is low, to thereby obtain those effects in a balanced manner over the power saving mode.

Further, the above-mentioned control by the power control section 91 is performed utilizing the remaining heat of the fixing device 8. Therefore, the above-mentioned effects may be obtained by using a general fixing device, that is, a fixing device that is high in heat capacity, relatively long in recovery time to the normal mode, and low in cost, without any modification. Further, in a case of using a special fixing device having a small heat capacity in order to reduce the recovery time of the fixing device and enhance user convenience, there arises a need to reduce the initialization time of the control system with the reduction in recovery time of the fixing device, and hence a memory for storing a program for reducing the initialization time needs to be provided separately. In this embodiment, however, such special fixing device is not used and accordingly the above-mentioned memory is not needed, with the result that the cost for the fixing device and hence the entire multifunction peripheral may be reliably reduced. In other words, with the low-cost configuration that does not use the special fixing device, both the effect of enhancing user convenience and the effect of reducing the power consumption of the main body system 90 may be obtained in a balanced manner.

Further, the multifunction peripheral 100 in this embodiment is a color image forming apparatus, which is higher in heat capacity of the used fixing device 8 (takes more time to be cooled) than a monochrome image forming apparatus, and retains the remaining heat longer. Therefore, especially in such color image forming apparatus as in this embodiment, the above-mentioned control utilizing the remaining heat of the fixing device 8 is highly effective.

Further, the power control section 91 switches among the levels of the power saving mode in order from Level 1 to Level 4 with the reduction in remaining heat temperature after turning OFF the fixing heaters 81a and 82a (see FIG. 5). The direction from Level 1 toward Level 4 is a direction in which the recovery time to the normal mode becomes longer and longer and is also a direction in which the power consumption of the main body system 90 becomes smaller and smaller (see FIG. 6) so that the power saving mode becomes more and more (gradually) extensive. By thus gradually switching among the levels of the power saving mode by the power control section 91 in the direction in which the power saving mode becomes more and more extensive, the control of the power saving mode may be simply performed by gradually increasing the number of the system control sections and function blocks to which power supply is stopped as shown in FIG. 6 or by stopping the operation clock of the system control sections, and hence the switching among the levels of the power saving mode may be realized with simple control.

Further, with the above-mentioned level switching by the power control section 91, as the reduction in remaining heat temperature becomes smaller (as the time elapsed after the fixing heaters 81a and 82a are turned OFF becomes shorter), the recovery time to the normal mode becomes shorter, with the result that the effect of enhancing user convenience may be increased. Further, with the above-mentioned level shifting by the power control section 91, as the remaining heat temperature becomes lower, the power consumption of the main body system 90 becomes smaller and smaller. Consequently, as the time elapsed after the fixing heaters 81a and 82a are turned OFF becomes longer, the power saving effect may be increased.

Further, with the reduction in remaining heat temperature after turning OFF the power supply to the fixing heaters 81*a* and 82*a*, the power control section 91 increases the number of the function blocks to which power supply is stopped, to thereby switch among the levels of the power saving mode of the main body system 90. By thus controlling the power supply, the switching among the levels of the power saving mode may be reliably realized.

Further, with the reduction in remaining heat temperature after turning OFF the power supply to the fixing heaters 81*a* and 82*a*, the power control section 91 increases the number of the system control sections to which the power supply is stopped or stops the operation clock of the system control sections, to thereby switch among the levels of the power saving mode. Such control may also reliably realize the switching among the levels of the power saving mode.

Further, in this embodiment, Level 4 of the power saving mode includes the plurality of Sublevels 4-1 and 4-2 which are the same in power consumption of the main body system 90 and are different from one another in recovery time to the normal mode. In this case, between Sublevels 4-1 and 4-2, it is possible to manage the power saving mode with the same power consumption and different recovery times to the normal mode.

Note that, in this embodiment, only Level 4 has two sublevels set thereto, but it should be understood that a plurality of sublevels may be set also for other Levels 1 to 3 so as to perform control with the same power consumption and different recovery times between sublevels in the same level. Stated differently, at least one level of the power saving mode may include a plurality of sublevels with different recovery times to the normal mode from one another.

Further, in this embodiment, the temperature of the heating roller 81 after the fixing heaters 81*a* and 82*a* are turned OFF is detected by the temperature sensor 93 as the remaining heat temperature of the fixing device 8, and the power control section 91 switches among the levels of the power saving mode based on the remaining heat temperature of the heating roller 81. Therefore, in the configuration in which the temperature of the heating roller 81 is detected as the remaining heat temperature, the above-mentioned effects may be obtained by the control by the power control section 91. Further, without separately providing the special temperature sensor for detecting the remaining heat temperature, the existing temperature sensor 93 may be effectively utilized to realize the above-mentioned control based on the remaining heat temperature.

Further, as shown in FIG. 5, this embodiment employs the fixing device 8 having such large heat capacity that the remaining heat temperature is 100° C. or higher until 5 minutes have elapsed after the fixing heaters 81*a* and 82*a* are turned OFF (power supply thereto is turned OFF) and the remaining heat temperature is 65° C. or higher until 15 minutes have elapsed after the fixing heaters 81*a* and 82*a* are turned OFF. In the configuration in which the fixing device 8 having such large heat capacity is used, the above-mentioned effects of this embodiment may be obtained.

Note that, in this embodiment, four levels of Levels 1 to 4 are set as the plurality of levels of the power saving mode. However, the number of the levels is not limited thereto, and it should be understood that the number of levels may be further increased and the levels may be switched depending on the remaining heat temperature. Further, in this embodiment, the number of the system control sections for which the operation clock is stopped is only one (only the main body control section 96). However, the operation clock for two or more system control sections may be stopped to increase the number of levels of the power saving mode.

Note that, in this embodiment, the example in which the image forming apparatus is constituted by the multifunction peripheral 100 has been described. However, the configuration and the settings and control for the power saving mode described in this embodiment are also applicable to other image forming apparatuses such as a copier, a printer, and a facsimile machine. Further, in this embodiment, the tandem color image forming apparatus has been described. However, the present invention is not limited thereto, and the configuration and the like of this embodiment are also applicable to a rotary color image forming apparatus and a monochrome image forming apparatus.

The exemplary embodiment of the present invention has been described above. However, the scope of the invention is not limited thereto, and various modifications may be made thereto without departing from the spirit of the invention.

What is claimed is:

1. An image forming apparatus, in which a power supply mode is shifted between a normal mode and a power saving mode that requires lower power consumption than the normal mode, the image forming apparatus comprising:
a main body system comprising a fixing device for fixing a toner image to paper by heat generated through power supply to a heating element;
a power control section for controlling power supply to the main body system to turn OFF the power supply to the heating element, and causing the main body system to shift from the normal mode to the power saving mode; and
a temperature detecting section for detecting, as remaining heat temperature, temperature of the fixing device due to remaining heat after the power supply to the heating element is turned OFF,
wherein the power saving mode comprises a plurality of levels that are different in recovery time to the normal mode and in power consumption of the main body system,
wherein the plurality of levels are set to correspond to the remaining heat temperature so that the recovery time to the normal mode becomes shorter as the remaining heat temperature is higher, and the power consumption of the main body system becomes lower as the remaining heat temperature is lower, and
wherein, depending on a change in the remaining heat temperature, the power control section switches to a level corresponding to the remaining heat temperature, of the plurality of levels of the power saving mode of the main body system.

2. An image forming apparatus according to claim 1, wherein the power control section switches among the plurality of levels of the power saving mode of the main body system in order so that the recovery time to the normal mode sequentially becomes longer and the power consumption of the main body system sequentially becomes lower as the remaining heat temperature becomes lower after the power supply to the heating element is turned OFF.

3. An image forming apparatus according to claim 1,
wherein the main body system further comprises a plurality of function blocks for performing predetermined functions, and
wherein the power control section switches among the plurality of levels of the power saving mode of the main body system by increasing a number of the function blocks to which power supply is stopped as the remaining heat temperature becomes lower after the power supply to the heating element is turned OFF.

4. An image forming apparatus according to claim 3, wherein the main body system further comprises a plurality of system control sections for controlling operations of the plurality of function blocks, and wherein the power control section switches among the plurality of levels of the power saving mode of the main body system, one of by increasing a number of the system control sections to which power supply is stopped, and by stopping an operation clock of at least one of the plurality of system control sections as the remaining heat temperature becomes lower after the power supply to the heating element is turned OFF.

5. An image forming apparatus according to claim 1, wherein the main body system further comprises an operation panel comprising a liquid crystal display section, the operation panel receiving setting input from a user, and wherein the power control section switches to the level corresponding to the remaining heat temperature, of the plurality of levels of the power saving mode, by turning OFF the liquid crystal display section.

6. An image forming apparatus according to claim 5, wherein the power control section switches to the level corresponding to the remaining heat temperature, of the plurality of levels of the power saving mode, by stopping power supply to the operation panel.

7. An image forming apparatus according to claim 1, wherein the main body system further comprises:
   an image forming section for forming an image on the paper;
   an operation panel for receiving setting input from a user;
   a scanner section for reading an image of an original;
   an engine control section for controlling the image forming section;
   a main body control section for controlling the engine control section based on the setting input received by the operation panel; and
   a scanner control section for controlling image reading performed by the scanner section, and wherein the power control section switches to the level corresponding to the remaining heat temperature, of the plurality of levels of the power saving mode, by stopping power supply to at least one of the engine control section, the main body control section, and the scanner control section.

8. An image forming apparatus according to claim 7, wherein the power control section switches to the level corresponding to the remaining heat temperature, of the plurality of levels of the power saving mode, by stopping an operation clock of the main body control section.

9. An image forming apparatus according to claim 1, wherein at least one of the plurality of levels of the power saving mode comprises a plurality of sublevels with the same power consumption of the main body system and different recovery times to the normal mode from one another.

10. An image forming apparatus according to claim 1, wherein the fixing device comprises a heating member heated by the heating element, and a pressure member pressed against the heating member, and fixes the toner image on the paper, which is transported between the heating member and the pressure member, to the paper by heat of the heating member, and wherein the temperature detecting section detects, as the remaining heat temperature, temperature of the heating member after the power supply to the heating element is turned OFF.

11. An image forming apparatus according to claim 1, wherein the fixing device has such heat capacity that the remaining heat temperature is 100° C. or higher until 5 minutes have elapsed after the power supply to the heating element is turned OFF.

12. An image forming apparatus according to claim 1, wherein the fixing device has such heat capacity that the remaining heat temperature is 65° C. or higher until 15 minutes have elapsed after the power supply to the heating element is turned OFF.

13. An image forming apparatus according to claim 1, wherein the main body system further comprises an image forming section for forming a color image on the paper.

* * * * *